United States Patent
Bazer-Bachi et al.

(10) Patent No.: US 10,022,702 B2
(45) Date of Patent: Jul. 17, 2018

(54) SPHEROIDAL ALUMINA PARTICLES WITH IMPROVED MECHANICAL STRENGTH HAVING A MACROPOROUS MEDIAN DIAMETER IN THE RANGE 0.05 TO 30 μM

(71) Applicant: IFP Energies Nouvelles, Rueil-Malmaison (FR)

(72) Inventors: Delphine Bazer-Bachi, Irigny (FR); Christine Dalmazzone, Viroflay (FR); Aurelie Dandeu, Saint-Just Chaleyssin (FR); Fabrice Diehl, Lyons (FR); Vincent Le Corre, Saint-Just Chaleyssin (FR); Joseph Lopez, Saint Julien les Rosiers (FR); Anne Lise Taleb, Saint Maurice sur Dargoire (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 109 days.

(21) Appl. No.: 15/148,109

(22) Filed: May 6, 2016

(65) Prior Publication Data
US 2016/0325269 A1 Nov. 10, 2016

(30) Foreign Application Priority Data
May 7, 2015 (FR) ..................... 15 54097

(51) Int. Cl.
| | | |
|---|---|---|
| B01J 21/00 | (2006.01) | |
| B01J 21/04 | (2006.01) | |
| B01J 23/42 | (2006.01) | |
| C01B 3/40 | (2006.01) | |
| C01F 7/02 | (2006.01) | |
| C01F 7/24 | (2006.01) | |
| B01J 23/40 | (2006.01) | |
| B01J 32/00 | (2006.01) | |
| C01F 7/44 | (2006.01) | |
| C01B 3/42 | (2006.01) | |

(52) U.S. Cl.
CPC .............. *B01J 21/04* (2013.01); *B01J 23/40* (2013.01); *B01J 23/42* (2013.01); *B01J 32/00* (2013.01); *C01B 3/40* (2013.01); *C01B 3/42* (2013.01); *C01F 7/02* (2013.01); *C01F 7/24* (2013.01); *C01F 7/447* (2013.01); *C01B 2203/0227* (2013.01); *C01B 2203/107* (2013.01); *C01B 2203/1082* (2013.01); *C01B 2203/1247* (2013.01); *C01B 2203/148* (2013.01); *C01P 2004/32* (2013.01); *C01P 2004/51* (2013.01); *C01P 2004/60* (2013.01); *C01P 2004/61* (2013.01); *C01P 2006/11* (2013.01); *C01P 2006/12* (2013.01); *C01P 2006/14* (2013.01); *C01P 2006/16* (2013.01); *C01P 2006/17* (2013.01); *Y02P 20/52* (2015.11)

(58) Field of Classification Search
CPC . B01J 21/04; B01J 23/38; B01J 27/135; B01J 35/1019; B01J 35/1042; C01F 7/447; C01F 7/02; C01F 7/24; C04B 35/111; C04B 35/6263; C01P 2004/32; C01P 2004/52; C01P 2004/61; C01P 2006/12; C01P 2006/14; C01P 2006/17
USPC ... 502/8, 439, 332, 302–304, 227, 229, 230, 502/349, 353–355, 325–327; 252/373; 585/899; 423/625, 628
See application file for complete search history.

(56) References Cited

U.S. PATENT DOCUMENTS

| | | | |
|---|---|---|---|
| 4,514,511 A | 4/1985 | Jacques et al. | |
| 6,635,598 B2 * | 10/2003 | Dongara | B01J 23/8966 502/224 |
| 9,669,387 B2 * | 6/2017 | Lacombe | C04B 35/111 |
| 2014/0357471 A1 | 12/2014 | Lacombe et al. | |

FOREIGN PATENT DOCUMENTS

| | | |
|---|---|---|
| CN | 102765737 B | 4/2014 |
| FR | 2527197 A1 | 11/1983 |
| FR | 2984180 A1 | 6/2013 |

OTHER PUBLICATIONS

Search Report dated Mar. 21, 2016 issued in corresponding FR 1554097 application (pp. 1-2).
A. Islam et al., "Synthesis and Characterization of Millimetric Gamma Alumina Spherical Particles by Oil Drop Granulation Method", Journal of Porous Materials, vol. 19, No. 5 (2012) pp. 807-817.
English Abstract of CN 102765737 A published Nov. 7, 2012.

* cited by examiner

*Primary Examiner* — Steven J Bos
(74) *Attorney, Agent, or Firm* — Millen, White, Zelano and Branigan, P.C.

(57) ABSTRACT

The present invention concerns spheroidal alumina particles characterized by a BET specific surface area in the range 150 to 300 m²/g, a mean particle diameter in the range 1.2 to 3 mm and a particle diameter dispersion, expressed as the standard deviation, not exceeding 0.1, a total pore volume, measured by mercury porosimetry, in the range 0.50 to 0.85 mL/g, a degree of macroporosity within a particle of less than 30%, and in which the dispersion of the diameters of the macropores, expressed as the ratio D90/D50, does not exceed 8.
The invention also concerns processes for the preparation of said particles as well as catalysts comprising said particles as a support, and their use in catalytic hydrocarbon treatment processes, in particular in a catalytic reforming process.

16 Claims, No Drawings

SPHEROIDAL ALUMINA PARTICLES WITH IMPROVED MECHANICAL STRENGTH HAVING A MACROPOROUS MEDIAN DIAMETER IN THE RANGE 0.05 TO 30 μM

FIELD OF THE INVENTION

The invention relates to spheroidal alumina particles for use as a support for catalysts and to processes for the preparation of particles of this type.

The invention also relates to catalysts comprising particles of this type as a support and to their use in catalytic hydrocarbon treatment processes, in particular in catalytic reforming processes.

PRIOR ART

The present invention concerns spheroidal alumina particles obtained by the process known as "drop coagulation", also known as oil drop, and for application in catalytic reforming.

Spheroidal alumina particles for use as a porous catalyst support are well known to the person skilled in the art.

As an example, the document U.S. Pat. No. 2,422,499 describes a process for the production of particles of this type using the process known as the oil drop process.

The principle of this technique consists of preparing an aqueous sol of alumina (boehmite) and of dropping the alumina sol in fine droplets through a nozzle into a column comprising an upper phase which is not miscible with water and a lower aqueous phase. The particles are thus shaped as they pass through the phase which is not miscible with water and by subsequent coagulation in the aqueous phase. Once collected, the particles are washed, dried and calcined. Spheroidal alumina particles are thus obtained.

Particularly important parameters to be controlled during the synthesis of spheroidal particles of this type include the density, the pore volume and the pore distribution, because they affect the final use of these particles. It is also important, in particular in a catalytic application carried out in a moving bed, for the size of the particles to be as homogeneous as possible in order to ensure that the catalyst flows in a fluid manner.

These particles usually have a mesoporous and macroporous texture. The mesoporosity results from organization of the boehmite platelets, while the macroporosity is generated in a sacrificial manner with the aid of the pore-forming agent. The presence of mesopores in these supports is an essential factor in ensuring that the catalytic reactions run smoothly. Regarding the macropores, it is known from document FR 1 503 495 that in order to reduce the density of the particles, it is possible to add pore-forming agents to the alumina sol. During the formation of particles, these pore-forming agents, which are subsequently eliminated during the calcining step, create macropores in the particle. This macroporosity has the effect of increasing the pore volume and thus of reducing the density of the particle.

However, if this macroporosity is not controlled, it may have a negative impact on the mechanical strength of the supports, and in particular on the mechanical strength of low density supports.

The mechanical strength (in particular the crushing and wear strength) is a vital parameter to be taken into account when envisaging using the alumina particle in catalysis. In effect, when being used, for example in a moving bed, the particles of alumina are subjected to shocks and frictional phenomena which could cause the formation of fines and/or chips which run the risk of clogging the facilities or filters and which, furthermore, contribute to losing part of the catalyst charged into the catalytic reactor.

The document CN10231134 describes macroporous spheroidal alumina particles prepared by a preparation process which differs from the oil drop process and in which a W/O emulsion is prepared (water/oil emulsion, i.e. an emulsion of the aqueous phase in an oily phase type) of an oily phase and an aqueous phase comprising an alumina sol, microspheres of polymer as the pore-forming agent and a coagulation agent. The emulsion is then stirred and heated in order to gel the alumina sol in the oily phase into particles. The particles which have thus been formed are then separated, matured, dried and calcined.

The macropores of the alumina particles are uniform in size and can be controlled to within a range of less than 1 μm, and the spheroidal particles have a controllable size and have a high mechanical strength. More particularly, the spheroidal alumina particles described have a specific surface area in the range 100 to 350 m$^2$/g, a total pore volume in the range 0.5 to 1.5 mL/g, a median macropore diameter in the range 0.05 to 1 μm (50 to 1000 nm), a particle diameter in the range 0.1 to 5 mm and a mechanical strength in the range 70 to 150 N. Those particles are described as being able to be used as a catalyst support, adsorbent, chromatographic packing, electrode or sound or thermal insulation material. However, that document does not envisage a particular use of the particles as a support for a catalytic reforming catalyst, that document neither describing the importance of homogeneity in the particle size nor the importance of limiting the degree of macroporosity within a particle.

The document WO2013/093221 discloses spheroidal alumina particles prepared by the oil drop technique for a catalyst support application, having a mesoporous and macroporous texture and in which the macroporous volume is low compared with the mesopore volume in order to increase the mechanical strength. More particularly, the spheroidal alumina particles comprise an accessible volume determined from nitrogen adsorption isotherms, termed $V_{meso}$, which represent the mesopore volume, which is in the range 0.65 to 0.85 mL/g and a volume of pores with a diameter of less than 7 μm, termed $V_{meso+macro}$, measured by mercury porosimetry, which is in the range 0.65 to 0.85 mL/g, said particles comprising a mean diameter in the range 1.2 to 3 mm, a BET specific surface area in the range 150 to 300 m$^2$/g and a settled packing density (SPD) in the range 0.5 to 0.6 g/mL. The spheroidal alumina particles generally have a mean grain crushing strength (GCS) of at least 2.5 daN (25 N). However, the size dispersion of the macroporosity is not controlled.

SUMMARY OF THE INVENTION

The aim of the invention is to propose spheroidal alumina particles with a homogeneous size having a mesoporous and macroporous texture in which the macroporosity has a small size dispersion and in which the pore volume is primarily mesoporous. These particles have an improved mechanical strength.

In fact, controlling the macroporosity, in particular controlling the degree of macroporosity within a particle and controlling the size dispersion of the macroporosity are important for the production of alumina particles which have two contrasting characteristics, namely the desired density, in particular a low density, and good mechanical strength.

More particularly, the invention concerns spheroidal alumina particles characterized by a BET specific surface area in the range 150 to 300 m$^2$/g, a mean particle diameter in the range 1.2 to 3 mm and a particle diameter dispersion, expressed as the standard deviation, not exceeding 0.1, a total pore volume, measured by mercury porosimetry, in the range 0.50 to 0.85 mL/g, a degree of macroporosity within a particle of less than 30%, and in which the dispersion of the diameters of the macropores, expressed as the ratio D90/D50, does not exceed 8.

In a variation, the value for the settled packing density (SPD) is in the range 0.4 to 0.8 g/mL.

In a variation, the mean grain crushing strength value (GCS) is at least 25 N.

In a variation, the total pore volume, measured by mercury porosimetry, is in the range 0.60 to 0.85 mL/g.

In a variation, the dispersion of the diameters of the macropores, expressed as the ratio of the diameters D90/D50, does not exceed 6.

The particular pore distribution observed in the spheroidal alumina particles of the invention is primarily due to their preparation processes using either a solid pore-forming agent or a liquid pore-forming agent.

Thus, in accordance with a first variation, the invention concerns a process for the preparation of spheroidal alumina particles in accordance with the invention, comprising the following steps:

a) preparing a suspension comprising water, an acid and at least one boehmite powder, b) adding a solid pore-forming agent having a particle size in the range 0.05 to 30 μm to the suspension obtained in step a), c) mixing the suspension obtained in step b) until the viscosity of said mixture is in the range 200 to 700 mPa·s, d) shaping the spheroidal particles by drop coagulation using the mixture obtained in step c), e) drying the particles obtained in step d), f) calcining the particles obtained in step e).

In accordance with this variation, the solid pore-forming agent is preferably selected from starches, flours, latex, polystyrene or acrylic particles, polysaccharides, carbon black particles and sawdust.

In accordance with this variation, the proportion of solid pore-forming agent, expressed as the ratio of the mass of the pore-forming agent with respect to the total mass of oxides, is preferably in the range 0.2% to 50% by weight.

In accordance with a second variation, the invention concerns a process for the preparation of spheroidal alumina particles in accordance with the invention, comprising the following steps:

a) preparing a suspension comprising water, an acid and at least one boehmite powder, b') adding at least one liquid pore-forming agent, at least one surfactant and optionally water, or an emulsion comprising at least one liquid pore-forming agent, at least one surfactant and water, to the suspension obtained in step a), b'') dispersing the suspension obtained in step b') with the aid of a disperser functioning at a shear rate in the range 1000 to 200000 s$^{-1}$, c) mixing the suspension dispersed in step b'') until the viscosity of said mixture is in the range 200 to 700 mPa·s, d) shaping the spheroidal particles by drop coagulation using the mixture obtained in step c), e) drying the particles obtained in step d), f) calcining the particles obtained in step e).

In accordance with this variation, the liquid pore-forming agent is preferably selected from greases, oils and mineral waxes, fats, hydrocarbons and oil cuts and the surfactant is selected from a non-ionic or ionic surfactant.

In accordance with this variation, the proportion of the mass of the liquid pore-forming agent to the total mass of oxides is in the range 0.2% to 50% by weight and the proportion of surfactant, defined as being equal to the ratio of the mass of surfactant to the mass of pore-forming agent, is preferably in the range 1% to 25% by weight.

In accordance with this variation, at least one solid pore-forming agent with a particle size in the range 0.05 to 30 μm may also be added to the suspension of step b').

In the two variations, the suspension of step a) may furthermore comprise a charge of alumina or alumina precursor constituted by particles with a volumetric median diameter of 50 μm or less.

The invention also pertains to a catalyst comprising a support formed by particles in accordance with the invention or prepared in accordance with their preparation process and one or more noble metals selected from group VIIIB of the periodic table.

In a variation, the catalyst may further comprise one or more elements selected from groups IA, IIA, IIIA, IVA, VA and the group constituted by fluorine, chlorine, bromine and iodine.

The invention also pertains to the use of the catalyst of the invention for carrying out a catalytic reforming reaction.

DETAILED DESCRIPTION

Spheroidal Alumina Particles

The invention concerns spheroidal alumina particles characterized by a BET specific surface area in the range 150 to 300 m$^2$/g, a mean particle diameter in the range 1.2 to 3 mm and a particle diameter dispersion, expressed as the standard deviation, not exceeding 0.1, a total pore volume, measured by mercury porosimetry, in the range 0.50 to 0.85 mL/g, a degree of macroporosity within a particle of less than 30%, and in which the dispersion of the diameters of the macropores, expressed as the ratio D90/D50, does not exceed 8.

The term "macropores" means pores with an opening of more than 50 nm.

The term "mesopores" means pores with an opening in the range 2 nm to 50 nm, limits included.

The term "micropores" means pores with an opening of less than 2 nm.

In the remainder of the text, the groups for the chemical elements are given using the CAS classification (CRC Handbook of Chemistry and Physics, published by CRC press, editor in chief D. R. Lide, 81$^{st}$ edition, 2000-2001). As an example, group VIII in the CAS classification corresponds to metals from columns 8, 9 and 10 of the new IUPAC classification.

The spheroidal alumina particles of the invention have a BET specific surface area in the range 150 to 300 m$^2$/g, preferably in the range 150 to 220 m$^2$/g. The term "BET specific surface area" means the specific surface area determined by nitrogen adsorption complying with ASTM standard D 3663-78 based on the BRUNAUER-EMMETT-TELLER method described in the journal "The Journal of the American Society", 60, 309, (1938).

The spheroidal alumina particles of the invention have a mean particle diameter in the range 1.2 to 3 mm, preferably in the range 1.4 to 2 mm, and more preferably in the range 1.5 to 1.9 mm.

The spheroidal alumina particles of the invention have a total pore volume, measured by mercury porosimetry, in the range 0.50 to 0.85 mL/g, preferably in the range 0.60 to 0.85 mL/g.

The total pore volume is measured by mercury intrusion porosimetry in accordance with ASTM standard D4284-12 at a maximum pressure of 4000 bar (400 MPa) using a surface tension of 484 dyne/cm and a contact angle of 140°. The value from which mercury fills all of the intergranular voids is fixed at 0.2 MPa and beyond this, it is assumed that the mercury penetrates into the pores of the sample. The term "total pore volume" means the sum of the volume of the mesopores and the volume of the macropores with a diameter of up to 10 µm measured by mercury intrusion porosimetry.

The degree of macroporosity within a particle is determined from an analysis of a scanning electron microscope image, assuming that all of the pores have a diameter in the range 0.05 µm to 30 µm. The scanning electron microscope is used in order to quantify the number and size of the macropores, for example on a ZEISS Supra40® microscope. Observations are carried out on a polished section of these samples using backscattered electrons (chemical contrast). The image analysis to determine the distribution of the macropore sizes was carried out using image processing software starting from 5 images taken of 5 different beads and with a resolution of 2048*1536 pixels. The quantification method can be used to determine the number and size of macropores in the range 0.2 to 30 µm from images taken at a magnification of ×500. This method for the determination of macropores is generally completed by or substituted with the method known as "small macropore quantification", which can be used to determine the number and size of macropores in the range 0.05 to 0.5 µm from images taken at a magnification of ×2500. The total surface area of the macropores is normalized to the surface area of the image in order to obtain the degree of macroporosity, denoted $p_{macro}$. This degree of macroporosity apparent from the image is considered to be identical to the volume fraction of macroporosity of the particle. The person skilled in the art will be able to analyse the images sufficiently to obtain a degree of macroporosity which is representative of the whole of the particle.

The spheroidal alumina particles of the invention advantageously have a degree of macroporosity within a particle of less than 30% of the total pore volume, preferably less than 25% and more particularly preferably less than 20%.

The spheroidal alumina particles of the invention have a median macropore diameter, viewed using a scanning electron microscope, in the range 0.05 µm (50 nm) to 30 µm (30000 nm). In a first variation, in particular when a solid pore-forming agent is used for the preparation of the spheroidal alumina particles, the median macropore diameter is in the range 0.05 µm (50 nm) to 30 µm (30000 nm), preferably in the range 1 µm (1000 nm) to 5 µm (5000 nm).

In a second variation, in particular when a liquid pore-forming agent is used to prepare the spheroidal alumina particles, the median macropore diameter is preferably in the range 0.05 µm (50 nm) to 2 µm (2000 nm).

The median macropore diameter, also termed D50, is defined as the diameter at which, from the totality of the pores constituting the macroporous volume, all of the pores with a size below this diameter constitute 50% of the number of macropores. This diameter is determined by processing scanning electron microscope (SEM) images obtained after observation of polished sections in backscattered electron mode.

The D90 diameter is defined as being the diameter at which, from the totality of the pores constituting the macroporous volume, all of the pores with a size below this diameter constitute 90% of the number of macropores determined by this same treatment. This diameter is determined by processing scanning electron microscope (SEM) images obtained after observation of polished sections in backscattered electron mode.

In accordance with one essential characteristic of the invention, the dispersion of the diameters of the macropores of said spheroidal alumina particles, expressed by the ratio D90/D50, does not exceed 8, and preferably does not exceed 6, and still more preferably does not exceed 4. Without wishing to be bound by a particular theory, it is in effect this distribution of the macropores which provides the spheroidal alumina particles with an improved mechanical strength, which is important in particular when they are used as a support in a catalytic reaction.

Advantageously, the spheroidal alumina particles have a settled packing density (SPD) value in the range 0.4 to 0.8 g/mL, preferably in the range 0.5 to 0.7 g/mL, and particularly preferably in the range 0.5 to 0.6 g/mL. The SPD is measured by introducing the spheroidal particles into a specimen the volume of which has already been determined then, by vibration, packing them until the volume is constant. The apparent density of the settled product is calculated by comparing the mass introduced and the volume occupied after packing. The uncertainty in the measurement is generally of the order of ±0.01 g/mL.

Thus, the spheroidal alumina particles of the invention, when they are used as a catalyst support, can be used to satisfy the requirements for an alumina support known as a dense support (for example with a settled packing density of about 0.6 to 0.7 g/mL) as well as the requirements for an alumina support known as a light support (for example with a settled packing density of about 0.5 to 0.6 g/mL).

Preferably, the value for the settled packing density (SPD) of said particles is in the range 0.5 to 0.6 g/mL.

One aim of the invention is to propose spheroidal alumina particles with a satisfactory mechanical strength for use in catalytic reactors. The spheroidal alumina particles of the invention advantageously have a mean grain crushing strength (GCS) value of at least 25 N, preferably at least 30 N.

The value for the GCS is obtained by means of a standardized test (ASTM standard D4179-01), which consists of subjecting an object of millimetric dimensions, such as a bead in the case of the present invention, to a compressive force generating rupture. This test is used to obtain an indirect measurement of the strength of a material.

The analysis is repeated over a certain number of particles taken individually, typically over a number of particles which is in the range 50 to 200, preferably in the range 100 to 200. The mean of the measured lateral rupturing forces at crush constitutes the mean GCS which is expressed in force units (N) in the case of spheroidal particles.

Process for the Preparation of Spheroidal Alumina Particles

The particular pore distribution observed in the spheroidal alumina particles of the invention is primarily due to their preparation processes using either a solid pore-forming agent or a liquid pore-forming agent.

Variation Using a Solid Pore-Forming Agent

Thus, in accordance with a first variation, the invention concerns a process for the preparation of spheroidal alumina particles in accordance with the invention, comprising the following steps:

a) preparing a suspension comprising water, an acid and at least one boehmite powder, b) adding a solid pore-forming agent having a particle size in the range 0.05 to 30 μm to the suspension obtained in step a), c) mixing the suspension obtained in step b) until the viscosity of said mixture is in the range 200 to 700 mPa·s, d) shaping the spheroidal particles by drop coagulation using the mixture obtained in step c), e) drying the particles obtained in step d), f) calcining the particles obtained in step e).

In step a) of the preparation process, a suspension is prepared which comprises water, an acid and at least one boehmite powder.

The term "boehmite powder" means an aluminium oxyhydroxide with formula AlO(OH) in the form of a powder, also known as an alumina gel. Boehmite exists in various types. The alumina precursor used satisfies the general formula $Al_2O_3 \cdot nH_2O$. In particular, hydrates of alumina may be used such as hydragillite, gibbsite, bayerite, boehmite or pseudo boehmite and amorphous or essentially amorphous alumina gels. A mixture of these products in any combination may also be employed.

Depending on the type of boehmite powder and its intrinsic pore volume, the quantity of pore-forming agent is adjusted to reach the envisaged total pore volume of the application.

For a given boehmite, increasing quantities of pore-forming agent will bring about increasing pore volumes and lower mechanical strengths. For a given boehmite/quantity of pore-forming agent, the present invention proposes optimizing the macroporous distribution, expressed by a D90/D50 ratio, which thus results in an improved mean grain crushing strength (GCS) value and thus in an improved mechanical strength.

The suspension of step a) is prepared by mixing, with vigorous stirring, an aqueous acidic solution to which one or more types of boehmite powder have been added.

During the preparation of the boehmite suspension, it is possible to add a charge of alumina. The quantity of charge employed, expressed as the % by weight of $Al_2O_3$, is 30% by weight or less with respect to the total equivalent weight of $Al_2O_3$ in the suspension. This charge may be selected from the group formed by aluminas known as transition aluminas, comprising at least one rho, chi, eta, gamma, kappa, theta, delta and alpha phase. The alumina charge may be in the powder form or in the form of particles of alumina obtained by milling and screening shaped alumina bodies; after milling, these particles have a median diameter of 50 μm or less, preferably less than 30 μm and more preferably less than 20 μm. The term "median diameter" as used here denotes the diameter of an equivalent sphere such that 50% of the particles by volume have a greater diameter and 50% have a smaller diameter.

The quantity of acid engaged in the suspension is such that the ratio of the mass of said acid with respect to the dry matter of the boehmite source or sources to that of the charge (if it is present in the suspension) is in the range 0.5% to 20% by weight, preferably in the range 1% to 15%. By way of example, the acid aqueous solution is a solution of a strong mineral acid such as $HNO_3$ or $H_2SO_4$.

The proportion of water engaged in the suspension is calculated in a manner such that the ratio of the dry matter (corresponding to the mass of the boehmite powder plus any charge, expressed in equivalents of $Al_2O_3$) to the total mass of water of the mixture is in the range 10% to 50% by weight, preferably in the range 15% to 40%.

Optionally, the suspension may comprise a salt of one or more elements selected from the groups IA, IIA, IIIA, IVA, VA, which act as promoters in the catalysts described below. These elements will thus be incorporated into the final spheroidal particles after drying and calcining. The proportion of the metallic salt or salts is calculated such that the quantity by weight of elements from groups IA, IIA, IIIA, IVA, VA in the final product after calcining is in the range 0.01% to 2% by weight, preferably in the range 0.05% to 1% by weight.

In step b) of the preparation process, a solid pore-forming agent with a particle size in the range 0.05 to 30 μm is added to the suspension obtained in step a).

The solid pore-forming agent may be added either alone or dispersed in a solvent.

When it is added dispersed in a solvent, the solvent may be water or an organic phase (the non-miscible organic phase may be selected from greases, oils and mineral waxes, fats, hydrocarbons and oil cuts). Preferably, the organic phase is a paraffinic cut containing 10 to 14 carbon atoms formed by normal and iso-paraffins and having a boiling point in the range 220° C. to 350° C. Preferably, the solvent is water.

The solid pore-forming agent is selected from starches (rice, corn, wheat, corn, peas, etc.), modified starches, flours (potatoes, sweet potato, manioc, etc.), latex particles, polystyrene, or acrylic such as, for example, commercially available products (Duramax® B1000, B1014, B1007 acrylic polymers from Rohm & Haas, Mowilith®, an acrylic polymer from Clariant, etc.), polysaccharides such as dextrose, dextrins, alginates or indeed carbon black particles, sawdust or other flours. Preferably, the solid pore-forming agent is selected from starches, modified starches and flours.

The size of the solid pore-forming agent particles is in the range 0.05 μm (50 nm) to 30 μm (30000 nm), preferably in the range 1 μm (1000 nm) to 5 μm (5000 nm). The term "size" means the median diameter of the particles of solid pore-forming agent. In accordance with the invention, the median diameter of the macropores is adjustable by means of the choice of pore-forming agent, in particular by means of the choice of the size of the solid pore-forming agent particles.

The proportion of solid pore-forming agent, expressed as the ratio of the mass of pore-forming agent to the total mass of oxides (boehmite and any charge), is in the range 0.2% to 50%, preferably in the range 0.5% to 40%.

In an alternative embodiment, a shearing step b") is carried out between step b) and step c) in the process for the preparation using a solid pore-forming agent, in which the suspension obtained in step b) is dispersed with the aid of a disperser functioning at a shear rate in the range 1000 to 200000 $s^{-1}$. This step can be used to increase deagglomeration of the particles of solid pore-forming agent in the suspension obtained in step b).

In accordance with step c) of the preparation process, the suspension obtained in step b) is mixed until the viscosity of said mixture is in the range 200 to 700 mPa·s, preferably in the range 250 to 400 mPa·s. Thus, the solution has rheological properties which are suitable for dropping through the nozzles of the oil drop head.

Mixing step c) may be carried out using any mixing device which can produce the desired viscosity, for example with a rotor of the type having three inclined blades. The shear rate applied in this step is generally in the range 50 $s^{-1}$ to 500 $s^{-1}$.

The term "viscosity" means the dynamic viscosity measured at ambient temperature, for example using a parallel plate or cone and plate rheometer with a shear rate of 100 s$^{-1}$.

In accordance with step d) of the preparation process, the spheroidal alumina particles are shaped by drop coagulation, also known as the oil drop technique, starting from the mixture obtained in step c).

This method consists of passing the mixture obtained in step c), for example the mixture (alumina suspension+solid pore-forming agent) into an oil drop head constituted by nozzles with an orifice with a calibrated size in order to form the droplets. The oil drop head is placed at the head of a column containing an upper organic phase and a lower phase constituted by a basic aqueous phase. The organic phase is selected in a planner such that it has a density which is slightly lower than that of water.

Preferably, step d) for shaping the particles comprises the following steps:

d1) transferring the mixture to a oil drop head equipped with nozzles the orifices of which are calibrated to form droplets;

d2) dropping the mixture under gravity into a column containing an organic phase in the upper portion and a basic aqueous phase in the lower portion in order to harvest the spheroidal particles from the foot of the basic aqueous phase.

As the droplet passes through the organic phase the spheres are formed, while gelling (or coagulation) occurs in the aqueous phase.

Surfactant type additives may be added to the aqueous phase in order to promote the passage of the interface and coagulation of the particles in the basic aqueous phase.

In the context of the invention, the non-miscible organic phase may be selected from greases, oils and mineral waxes, fats, hydrocarbons and oil cuts. Preferably, the organic phase is a paraffinic cut containing 10 to 14 carbon atoms, formed by normal and iso-paraffins, and with a boiling point in the range 220° C. to 350° C.

The basic aqueous phase is, for example, an ammoniacal solution, an ammonium carbonate solution or a solution of amines. Preferably, the basic aqueous phase is an ammoniacal solution.

A compound such as urea may also be introduced into the suspension of step a) and then is decomposed in the lower aqueous phase of the column. This compound, according to U.S. Pat. No. 4,542,113, can be used to provide for easy adjustment of the rise in viscosity.

At the end of the step for the formation of the spheroidal particles, the particles are recovered and separated from the aqueous phase, for example using a screen. It is also possible for the particles which have been formed in this manner to undergo one or more maturation steps, as recommended in application EP 0001023.

In step e) of the preparation process, the particles obtained in step d) are dried.

Step e) for drying the spheroidal particles of the process of the invention is carried out at a temperature in the range 40° C. to 150° C., in dry or moist air, generally for between 0.5 and 20 hours. The drying protocol may optionally comprise one or more constant temperature stages. It may optionally require varying humidities during drying, preferably between 10 and 1000 g of water per kg of dry air, more preferably between 40 and 1000 g of water per kg of dry air.

In step f) of the preparation process, the particles obtained in step e) are calcined.

Calcining step f) for the spheroidal particles is carried out at a temperature in the range 450° C. to 900° C., preferably in the range 550° C. to 800° C. for 0.5 to 12 hours, preferably in the range 1 to 8 hours, more preferably in the range 1 to 5 hours. This calcining step may comprise one or more constant temperature stages.

Variation with Liquid Pore-Forming Agent

In accordance with a second variation, the invention also concerns a process for the preparation of spheroidal alumina particles in accordance with the invention, comprising the following steps:

a) preparing a suspension comprising water, an acid and at least one boehmite powder, b') adding at least one liquid pore-forming agent, at least one surfactant and optionally water, or an emulsion comprising at least one liquid pore-forming agent, at least one surfactant and water, to the suspension obtained in step a), b") dispersing the suspension obtained in step b') with the aid of a disperser functioning at a shear rate in the range 1000 to 200000 s$^{-1}$, c) mixing the suspension dispersed in step b") until the viscosity of said mixture is in the range 200 to 700 mPa·s, d) shaping the spheroidal particles by drop coagulation using the mixture obtained in step c), e) drying the particles obtained in step d), f) calcining the particles obtained in step e).

Step a) of this preparation process using a liquid pore-forming agent is strictly identical to step a) described for the preparation process using a solid pore-forming agent.

In step b') of the preparation process, at least one liquid pore-forming agent, at least one surfactant and optionally water or an emulsion comprising at least one liquid pore-forming agent, at least one surfactant and water, are added to the suspension of step a).

The liquid pore-forming agent may be added in the form of an emulsion comprising at least one liquid pore-forming agent, at least one surfactant and water. When an emulsion is prepared in step b'), the emulsion is prepared by mixing the pore-forming agent, the surfactant and water. The quantity of water in the emulsion represents 5% to 20% by weight of the total quantity of water corresponding to the mixture (suspension of boehmite and emulsion). The emulsion is prepared at a temperature in the range 15° C. to 60° C., preferably in the range 20° C. to 40° C.

It is also possible to add the liquid pore-forming agent, the surfactant and optional water directly to the aqueous suspension containing the boehmite, i.e. without forming an initial emulsion, or to add them at the same time, or in successive steps. In this case, the same proportions of the various constituents described below are used.

The liquid pore-forming agent is a product which is not totally miscible with water, which can be eliminated by combustion and is liquid at ambient temperature. The liquid pore-forming agent may be selected from greases, oils and mineral waxes, fats, hydrocarbons and oil cuts. As an example, the liquid pore-forming agent is a paraffinic cut containing 10 to 14 carbon atoms, formed by normal and iso-paraffins, and having a boiling point in the range 220° C. to 350° C.

The proportion of liquid pore-forming agent, expressed as the ratio of the mass of pore-forming agent to the total mass of oxides (boehmite and any charge) is in the range 0.2% to 50% by weight, preferably in the range 0.5% to 45%.

The phase which is not miscible in water taking the place of the liquid pore-forming agent is dispersed with the aid of surfactants. Particularly suitable surfactants are non-ionic surfactants or ionic surfactants, used alone or as mixtures.

Any non-ionic, anionic or cationic surfactant or emulsifying mixture may be used with an HLB in the range 7 to 16 to permit the production of an oil in water emulsion: any commercial formulation may be cited, such as Galoryl®EM10 or Oparyl®EM10, non-ionic surfactants, or it may be produced from chemical families such as esters of sorbitan which may or may not be ethoxylated (such as Tween®80 and Span®80 from CRODA), ethylene oxide (EO)/propylene oxide (PO) block copolymers (such as Synperonic®PEL121 from CRODA), ethoxylated fatty acids or alcohols (such as Simulsol® ox1309L from SEPPIC or Rhodasurf® TR/6 from Solvay), ethoxylated fatty acid esters (such as Atlas® G1086 from CRODA), ethoxylated octylphenols (such as TRITON® X-100 from Union Carbide), used alone or as a mixture.

The term "HLB" signifies "hydrophilic/lipophilic balance". More specifically adapted to non-ionic compounds, this notion expresses the relationship between the hydrophilic nature and the lipophilic nature of the molecules of surface-active agents and as a consequence, allows the possible applications of these molecules to be predicted as a function of their composition. The HLB classification is established by the ratio between the fatty chain and the water-soluble group and varies between 0 (completely lipophilic) and 20 (completely hydrophilic). The HLB value of a surfactant may be calculated when its chemical structure is completely defined, or it may be determined experimentally. The HLB is classified on the Davies scale, which runs between 1 and 20. The value 1 corresponds to oleic acid, while the value 20 corresponds to potassium oleate. As a consequence, by gradually neutralizing oleic acid, it is possible to obtain all intermediate mixtures with a HLB value in the range 1 to 20 and to compare them with other surfactants with an unknown HLB value in order to determine their properties.

The proportion of surfactant present in the emulsion is defined as being equal to the ratio of the mass of surfactant to the mass of pore-forming agent. This ratio is in the range 1% to 25% by weight, preferably in the range 1% to 15% and highly preferably in the range 3% to 10%.

In step b") of the preparation process, the suspension obtained in step b') is dispersed using a disperser functioning at a shear rate in the range 1000 to 200000 $s^{-1}$.

The term "shear rate" means the speed of shearing. The application of a shear rate as defined to the suspension obtained in step b") can be used to optimize the macroporous distribution, expressed by a ratio D90/D50, thereby leading to an improved mean grain crushing strength value (GCS) and thus to an improved mechanical strength. The shear rate applied to said mixture during this step b") can disperse the liquid pore-forming agent in the alumina matrix contained in the suspension. In fact, during this step the liquid pore-forming agent contained in the mixture is homogeneously dispersed in said alumina matrix (boehmite) contained in said mixture in the form of small droplets which are substantially homogeneous in size, in order to generate, after calcining, the macroporosity responsible for the improvement to the mechanical strength.

The dispersion in step b") may be carried out using any appropriate means with the aid of any batch or continuous dynamic mixer known to the person skilled in the art. Devices constituted by a rotary agitator comprising one or more rotors fixed on a shaft which dissipate powers per unit volume of the order of $10^3$ to $10^9$ W/m³, more particularly of the order of $10^6$ to $10^8$ W/m³, are particularly suitable. The shear depends on the characteristics of the rotor, in particular on its geometry. Devices of this type are, for example, rotor and stator mixers (for example those sold by VMI Rayneri under the trade mark Ultramix®), colloidal mills, high pressure homogenizers or indeed ultrasonic devices.

The term "shear" should be understood to mean a "shear rate" or a "velocity gradient", which are two synonymous expressions to the person skilled in the art. The notion of "mean velocity gradient" in a stirred tank is defined, for example, in the article "Agitation Mélange—concepts théoriques de base" [Mixing and Stirring—fundamental theoretical concepts], by Michel Roustan, Jean-Claude Pharamond, Alain Liné in the publication "Techniques de l'ingénieur, traité Génie des Procédés—J3 800, page 13". This notion is, for example, used in the U.S. Pat. No. 6,638,918, which describes it in the same manner as in the preceding reference. Thus, the mean shear (Γmean) in the dispersed medium can be expressed in the following formula:

$$\Gamma_{mean}=kN$$

in which k is a proportionality constant which depends on the type of mixer blade and on the configuration of the mixer tank and N is the speed of the stirring rotors (in $s^{-1}$). $\Gamma_{mean}$ is expressed in $s^{-1}$. A peripheral velocity expressed by the expression:

$$V_{periph}=\pi ND$$

is associated with this notion of shear, in which D is the diameter of the stirring rotors expressed in meters and N is their rotational speed expressed in $s^{-1}$.

In accordance with the invention, the term "mixing under shear" means a dispersion produced by stirring at a peripheral speed, typically more than 4 $ms^{-1}$, preferably more than 10 $ms^{-1}$, and still more preferably in the range 10 $ms^{-1}$ to 40 $ms^{-1}$, which imparts a shear rate to the dispersed medium which is typically in the range 1000 to 200000 $s^{-1}$, preferably in the range 1300 $s^{-1}$ to 20000 $s^{-1}$.

Depending on the desired level of shear, the person skilled in the art will be capable of using a stirring system with a suitable geometry and of using it at a sufficient rotational speed to reach the desired rate of rotation and the level of shear. Depending on the nature of the stirring system and the size of the reactor, the rotation rate may be in the range 100 rpm to 30000 rpm, for example.

The person skilled in the art will readily be able to extrapolate this mode of operation and to transpose it to other tools of the same type. As an example, the person skilled in the art could turn to the article by C. Dalmazzone, Génération mécanique des émulsions [Mechanical emulsion generation], Oil & Gas Science Technology, 55, 2000, n°3, pp. 281-305, to target a mean droplet size as a function of the type of stirrer and the power generated.

In the case of a batch dispersion, the dispersion in step b") is carried out for a period in the range 1 to 60 minutes, preferably in the range 1 to 30 minutes, more preferably in the range 1 to 15 minutes, and more particularly preferably in the range 1 to 5 minutes.

The temperature at which the dispersion is produced in step b") is in the range 20° C. to 45° C., preferably in the range 20° C. to 40° C. However, care should be taken to avoid heating a system where the surfactants might be degraded.

The steps c) for mixing, d) for shaping, e) for drying and f) for calcining of the preparation process using a liquid pore-forming agent are strictly identical to steps c), d), e) and f) described for the preparation process using a solid pore-forming agent.

Variation with Solid Pore-Forming Agent and Liquid Pore-Forming Agent

The two variations of the preparation process described above may be carried out alone as described, or mixed in order to give rise to other hybrid preparation embodiments which are a function of technical and practical constraints.

In one embodiment, in the preparation process using a liquid pore-forming agent, at least one solid pore-forming agent with a particle size in the range 0.05 to 30 µm is added to the suspension of step b'). In this case, the preparation process is carried out in the presence of a solid pore-forming agent and a liquid pore-forming agent. This preparation process can thus be used to obtain spheroidal alumina particles which may have a trimodal porosity (mesoporosity resulting from the organization of platelets of boehmite and two sizes of macroporosity, one provided by the liquid pore-forming agent, the other provided by the solid pore-forming agent).

Use of Spheroidal Alumina Particles as a Catalytic Support

The spheroidal alumina particles are of application as a catalyst support for catalytic reactions, in particular in the catalytic reforming of gasoline.

Catalytic reforming processes can be used to significantly increase the octane number of gasoline fractions from straight run distillation of crude oil and/or from other refining processes such as catalytic cracking or thermal cracking, for example. The catalytic reforming process is a process which is very widely used by refiners to upgrade the heavy gasoline obtained by distillation. The hydrocarbons of the heavy gasoline feed (in particular paraffins and naphthenes) containing approximately 5 to 12 carbon atoms per molecule are transformed into aromatic hydrocarbons and into branched paraffins during this process. This transformation is obtained at high temperatures (on average in the range 480° C. to 520° C.), at low to medium pressures (0.2 to 2.5 MPa) and in the presence of a catalyst. Catalytic reforming produces a reformate which can be used to significantly improve the octane number of oil cuts, and it produces hydrogen. The reformate is mainly formed by $C_5^+$ compounds (containing at least 5 carbon atoms).

The typical feed treated during catalytic reforming comprises paraffinic, naphthenic and aromatic hydrocarbons containing 5 to 12 carbon atoms per molecule. This feed is defined, inter alia, by its density and its composition by weight. This feed is brought into contact with the catalyst of the present invention at a temperature in the range 300° C. to 700° C., preferably in the range 350° C. to 550° C., and more preferably in the range 380° C. to 530° C. The mass flow rate of feed treated per unit mass of catalyst may vary between 0.1 and 10 kg/(kg·h), preferably in the range 0.5 to 6 kg/(kg·h). The operating pressure may be fixed at between atmospheric pressure (0.1 MPa) and 4 MPa, preferably in the range 0.2 MPa to 3 MPa. A portion of the hydrogen produced is recycled in order to obtain a molar ratio of recycled hydrogen to hydrocarbon feed in the range 0.1 to 10, preferably in the range 1 to 8.

Reforming catalysts are porous solids generally comprising very pure alumina as a support, chlorine, platinum and at least one additional metal selected from the group formed by metals from groups IA, IIA, VIB, VIIIB, IIIA and IVA. These are bifunctional catalysts, i.e. they are constituted by two functions, a metallic function and an acidic function, each of the functions having a well-defined role in the activity of the catalyst. The metallic function essentially ensures the dehydrogenation of the naphthenes and paraffins and the hydrogenation of the coke precursors. The acidic function ensures the isomerization of the naphthenes and paraffins and the cyclization of the paraffins. The acidic function is provided by the support itself, usually a halogenated pure alumina. The metallic function is provided by a noble metal from the platinum family and at least one additional metal, principally tin for the continuous process (moving bed) and principally rhenium for the semi-regenerative process (fixed bed).

The invention also pertains to a catalyst comprising at least one or more noble metals selected from group VIIIB of the periodic table, in particular platinum, deposited on a support formed by the spheroidal alumina particles of the present invention. The quantity of noble metal in the catalyst of the invention is in the range 0.02% to 2% by weight, preferably in the range 0.05% to 1.5% by weight, more preferably in the range 0.1% to 0.8% by weight.

The catalyst of the invention may optionally also include at least one promoter selected from groups IA, IIA, IIIA, IVA, and VA of the periodic classification of the elements. These promoter elements are present in the catalyst in an amount, expressed as the oxide, which is generally in the range 0.01% to 2% by weight of catalyst, preferably in the range 0.05% to 1% by weight.

The catalyst of the invention may also preferably comprise a halogenated compound selected from the group constituted by fluorine, chlorine, bromine and iodine. The quantity of halogenated compound is generally in the range 0.1% to 8% by weight, preferably in the range 0.2% to 5% by weight of catalyst after calcining. Preferably, the halogenated compound is chlorine.

The catalyst is prepared using preparation processes which are known to the person skilled in the art, for example as described in FR2932101 or EP 2 441 516.

In accordance with one embodiment, it is possible to incorporate elements termed "promoters" during the formation of said particles. To this end, a soluble salt of one or more elements selected from groups IA, IIA, IIIA, IVA, VA from the periodic classification of the elements is added to the aqueous suspension of boehmite powder. In accordance with another embodiment, it is possible to incorporate all or a portion of the promoters into the support which has been formed, for example by impregnation.

Before using the catalyst in catalytic reforming, it undergoes a treatment in hydrogen in order to obtain a metallic phase which is active under the operating conditions which are known to the person skilled in the art.

By way of example, a catalyst for use as a catalyst for reforming an oil cut may comprise platinum, tin (optionally other metals) and chlorine, deposited on a spherical alumina support in accordance with the invention.

Finally, the catalysts may also be of application in steam reforming, cracking, hydrocracking, hydrogenation, dehydrogenation, or dehydrocyclization of hydrocarbons or of other organic compounds. This type of catalyst is of particular application in a continuous moving bed catalytic reforming process.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 15/54097, filed May 7, 2015 are incorporated by reference herein.

EXAMPLES

In all of Examples 1 to 4 below, only the phase for preparation of the mixture of the suspension of boehmite and the pore-forming agent (dispersion step b")) used for the oil drop method differ. After this formulation phase, the system undergoes stirring (mixing step c)) at 600 rpm with a 3 inclined blade rotor until a suspension with rheological properties adapted to the oil drop method is obtained (viscosity 250 mPa·s). The viscosity was measured with the aid of a cone and plate rheometer at a shear rate of 100 s$^{-1}$.

The oil drop column was charged with an ammoniacal solution at a concentration of 28 g/L and an organic solution constituted by the same oil cut as that used as the pore-forming agent to prepare the emulsion (organic phase as the upper layer). The suspension was dropped using calibrated nozzles. The beads were recovered from the bottom of the column and placed in a ventilated oven at 120° C. for 12 h. They were then calcined in dry air at 650° C. for 3 hours.

For all of these examples, the textural characteristics were comparable in order to demonstrate the impact of the preparation and optimization of the D90/D50 ratio on the mechanical properties of the material. Thus, these examples are not limiting and could be extrapolated to other systems having different pore-forming agent quantities/textures.

Example 1 (Comparative)

The support of Example 1 was prepared using a Pural SB3 type boehmite sold by Sasol.

A suspension containing 20% of mineral material (expressed as the % by weight of $Al_2O_3$) was prepared by mixing a charge of γ alumina with a volumetric median diameter of 50 µm and the Pural SB3 boehmite powder in an acidified aqueous solution containing 3.6% by weight of $HNO_3/Al_2O_3$.

The solid fraction of $Al_2O_3$ was made up of 88% by weight of boehmite and 12% of γ alumina. This suspension furthermore contained a pore-forming agent and a surfactant. The pore-forming agent was an organic phase comprising a mixture of paraffins containing 10 to 12 carbon atoms with a boiling point of approximately 290° C. and a density of 0.75 g/cm$^3$. The surfactant was Galoryl® EM10, a commercial emulsifying agent. These compounds were introduced in the following proportions: fraction by weight of pore-forming agent/water=9.4% and fraction by weight of surfactant/pore-forming agent=6%.

In this example, after adding all of the compounds, the suspension underwent direct mixing until the viscosity of the mixture was in the range 250 to 400 mPa·s. At this viscosity, the suspension had rheological properties which were suitable for dropping through nozzles. In this example, which was not in accordance with the invention, dispersion step b") was thus not carried out. The characteristics of the beads obtained after drying and calcining are given in Table 1.

Example 2 (In Accordance with the Invention)

The composition of the material was the same as in Example 1. In this example, the emulsification conditions (duration, rate applied) of step b") were adjusted. In this example, after adding all of the compounds, the suspension was passed through a rotor/stator device in which the shear rate was 1400 s$^{-1}$ for 5 minutes. Next, the suspension was stirred until the viscosity of the mixture was in the range 250 to 400 mPa·s. At this viscosity, the suspension had rheological properties which were suitable for dropping through nozzles. The characteristics of the beads obtained after drying and calcining are given in Table 1.

It should be noted that for the same textural properties, the improvement in the mechanical strength compared with the beads of Example 1 prepared without the dispersion system (step c) was linked to the reduction in the ratio D90/D50.

Example 3 (In Accordance with the Invention)

The composition of the material was the same as in Example 1. In this example, the emulsification conditions (duration, applied speed) of step b") were adjusted. In this example, after adding all of the compounds, the suspension was passed through a rotor/stator device in which the shear rate was 5000 s$^{-1}$ for 5 minutes. Next, the suspension was stirred until the viscosity of the mixture was in the range 250 to 400 mPa·s. At this viscosity, the suspension had rheological properties which were suitable for dropping through nozzles. The characteristics of the beads obtained after drying and calcining are given in Table 1.

It should be noted that increasing the shear rate compared with Example 2 in the dispersion system meant that the ratio D90/D50 could be reduced, and this had a direct consequence on the mechanical strength, which was improved.

Example 4 (In Accordance with the Invention)

The composition of the material was the same as in Example 1. In this example, the emulsification conditions (duration, rate applied) of step b") were adjusted. In this example, after adding all of the compounds, the suspension was passed through a rotor/stator device in which the shear rate was 5000 s$^{-1}$ for 1 minute 30. Next, the suspension was stirred until the viscosity of the mixture was in the range 250 to 400 mPa·s. At this viscosity, the suspension had rheological properties which were suitable for dropping through nozzles. The characteristics of the beads obtained after drying and calcining are given in the table.

It should be noted that for the same shear rate, the reduction in the emulsification period compared with Example 3 increased the ratio D90/D50, and this had a direct consequence on the mechanical strength which was slightly degraded.

Examples 5 to 8 describe the preparation of particles, also termed beads, in accordance with the invention in the presence of a solid pore-forming agent, optionally as a mixture with a liquid pore-forming agent.

Example 5 (In Accordance with the Invention)

Starch (25% by weight with respect to $Al_2O_3$) suspended in water was added to the suspension of peptised boehmite of Example 1. The suspension was stirred until the viscosity of the mixture was in the range 250 to 400 mPa·s. At this viscosity, the suspension had rheological properties which were suitable for dropping through nozzles. The characteristics of the beads obtained after drying and calcining are given in Table 1.

The ratio D90/D50 was of the order of 3 and directly linked to the source of starch used, and allowed an improved GCS to be obtained.

Example 6 (In Accordance with the Invention)

In this example, the macroporosity was increased to 50% with corn starch and to 50% by an emulsion as described in Example 1.

In this example, after adding all of the compounds, the suspension was passed through a rotor/stator device in which the shear was 10000 s$^{-1}$ for 5 minutes. Next, the suspension was stirred until the viscosity of the mixture was in the range 250 to 400 mPa·s. At this viscosity, the suspension had rheological properties which were suitable for dropping through nozzles. The characteristics of the beads obtained after drying and calcining are given in the table.

The ratio D90/D50 was 2.61 and the GCS was improved.

Example 7 (In Accordance with the Invention)

In this example, the macroporosity was increased to 50% with rice starch and to 50% by an emulsion as described in Example 1.

In this example, after adding all of the compounds, the suspension was passed through a rotor/stator device in which the shear was 10000 s$^{-1}$ for 5 minutes. Next, the suspension was stirred until the viscosity of the mixture was in the range 250 to 400 mPa·s. At this viscosity, the suspension had rheological properties which were suitable for dropping through nozzles. The characteristics of the beads obtained after drying and calcining are given in the table.

The ratio D90/D50 was 3.55 and the GCS was improved.

Example 8 (In Accordance with the Invention)

In this example, the macroporosity was increased to 25% with rice starch and to 75% with an emulsion as described in Example 1.

The suspension was stirred until the viscosity of the mixture was in the range 250 to 400 mPa·s. At this viscosity, the suspension had rheological properties which were suitable for dropping through nozzles. The characteristics of the beads obtained after drying and calcining are given in Table 1.

The ratio D90/D50 was of the order of 2.90 and directly linked to the source of starch used, and the GCS was improved.

TABLE 1

| $S_{BET}$ (m$^2$/g) | TPV (mL/g) | Dp at $V_{meso/2}$ (nm) | Pmacro (%) | GCS (N) | Mean diam of beads (mm) | Std deviation (bead diam) | D90/D50 |
|---|---|---|---|---|---|---|---|
| Example 1 (not in accordance): no step c) | | | | | | | |
| 208 | 0.68 | 10.7 | 18 | 22.0 | 1.84 | 0.09 | 8.15 |
| Example 2 (in accordance): liquid pore-forming agent, shear rate = 1400 s$^{-1}$, period 5 min | | | | | | | |
| 203 | 0.68 | 10.4 | 18 | 27.6 | 1.66 | 0.07 | 113.85 |
| Example 3 (in accordance): liquid pore-forming agent, shear rate = 5000 s$^{-1}$, period 5 min | | | | | | | |
| 203 | 0.71 | 10.3 | 18 | 33.5 | 1.72 | 0.07 | 2.66 |
| Example 4 (in accordance): liquid pore-forming agent, shear rate = 5000 s$^{-1}$, period 1 min 30 | | | | | | | |
| 198 | 0.70 | 10.8 | 18 | 30.9 | 1.81 | 0.08 | 3.32 |
| Example 5 (in accordance): solid pore-forming agent | | | | | | | |
| 227 | 0.71 | 8.7 | 18 | 29.0 | 1.90 | 0.09 | 3.05 |
| Example 6 (in accordance): solid pore-forming agent and liquid pore-forming agent | | | | | | | |
| 238 | 0.63 | 8.7 | 18 | 32.1 | 1.61 | 0.09 | 2.61 |
| Example 7 (in accordance): solid pore-forming agent and liquid pore-forming agent | | | | | | | |
| 213 | 0.73 | 9.8 | 18 | 29.5 | 1.74 | 0.05 | 3.55 |
| Example 8 (in accordance): solid pore-forming agent and liquid pore-forming agent | | | | | | | |
| 223 | 0.76 | 10.4 | 19 | 33.0 | 1.69 | 0.09 | 2.90 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Spheroidal alumina particles having a BET specific surface area of 150 to 300 m$^2$/g, a mean particle diameter 1.2 to 3 mm and a particle diameter dispersion, expressed as the standard deviation, not exceeding 0.1, a total pore volume, measured by mercury porosimetry, of 0.50 to 0.85 mL/g, a degree of macroporosity within a particle of less than 30%, and a dispersion of the diameters of macropores, expressed as a ratio D90/D50, not exceeding 8.

2. The spheroidal alumina particles according to claim 1, having a value for settled packing density of 0.4 to 0.8 g/mL.

3. The spheroidal alumina particles according to claim 1, having a mean grain crushing strength value of at least 25 N.

4. The spheroidal alumina particles according to claim 1, in which the total pore volume, measured by mercury porosimetry, is 0.60 to 0.85 mL/g.

5. The spheroidal alumina particles according to claim 1, in which the dispersion of the diameters of the macropores, expressed as D90/D50, does not exceed 6.

6. A process for the production of spheroidal alumina particles according to claim 1, comprising:

a) preparing a suspension comprising water, an acid and at least one boehmite powder,
b) adding a solid pore-forming agent having a particle size in the range 0.05 to 30 μm to the suspension obtained in a),
c) mixing the suspension obtained in b) until the viscosity of said mixture is in the range 200 to 700 mPa·s,
d) shaping the spheroidal particles by drop coagulation using the mixture obtained in step c),
e) drying the particles obtained in d),
f) calcining the particles obtained in e).

7. The process according to claim 6, in which the solid pore-forming agent is starch, flour latex, polystyrene or acrylic particles, a polysaccharide, carbon black particles or sawdust.

8. The process according to claim 6, in which the proportion of solid pore-forming agent, expressed as the ratio of the mass of the pore-forming agent with respect to the total mass of oxides, is in the range 0.2% to 50% by weight.

9. A process for the production of spheroidal alumina particles having a BET specific surface area of 150 to 300 m²/g, a mean particle diameter 1.2 to 3 mm and a particle diameter dispersion, expressed as the standard deviation, not exceeding 0.1, a total pore volume, measured by mercury porosimetry, of 0.50 to 0.85 mL/g, a degree of macroporosity within a particle of less than 30%, and a dispersion of the diameters of macropores, expressed as the ratio D90/D50, not exceeding 8, comprising:
    a) preparing a suspension comprising water, an acid and at least one boehmite powder,
    b') adding at least one liquid pore-forming agent, at least one surfactant and optionally water, or an emulsion comprising at least one liquid pore-forming agent, at least one surfactant and water, to the suspension obtained in a),
    b") dispersing the suspension obtained in b') with a disperser functioning at a shear rate in the range 1000 to 200000 s⁻¹,
    c) mixing the suspension dispersed in b") until the viscosity of said mixture is in the range 200 to 700 mPa·s,
    d) shaping the spheroidal particles by drop coagulation using the mixture obtained in step c),
    e) drying the particles obtained in d),
    f) calcining the particles obtained in e).

10. The process according to claim 9, in which the liquid pore-forming agent is a grease, oil, mineral wax, fat, hydrocarbon or oil cut and the surfactant is a non-ionic or ionic surfactant.

11. The process according to claim 9, in which the proportion of the liquid pore-forming agent, expressed as the ratio of the mass of liquid pore-forming agent to the total mass of oxides, is in the range 0.2% to 50% by weight and in which the proportion of surfactant, defined as being equal to the ratio of the mass of surfactant to the mass of pore-forming agent, is in the range 1% to 25% by weight.

12. The process according to claim 9, in which at least one solid pore-forming agent with a particle size in the range 0.05 to 30 μm is added to the suspension of b').

13. A process for the preparation of spherical alumina particles having a BET specific surface area of 150 to 300 m²/g, a mean particle diameter 1.2 to 3 mm and a particle diameter dispersion, expressed as the standard deviation, not exceeding 0.1, a total pore volume, measured by mercury porosimetry, of 0.50 to 0.85 mL/g, a degree of macroporosity within a particle of less than 30%, and a dispersion of the diameters of macropores, expressed as D90/D50, not exceeding 8 comprising:
    a) preparing a suspension comprising water, an acid and at least one boehmite powder,
    b) adding a solid pore-forming agent having a particle size in the range 0.05 to 30 μm to the suspension obtained in a),
    c) mixing the suspension obtained in b) until the viscosity of said mixture is in the range 200 to 700 mPa·s,
    d) shaping the spheroidal particles by drop coagulation using the mixture obtained in c),
    e) drying the particles obtained in d),
    f) calcining the particles obtained in (e),
in which the suspension of a) further comprises a charge of alumina or alumina precursor constituted by particles with a volumetric median diameter of 50 μm or less.

14. A catalyst comprising a support formed by particles according to claim 1 and one or more noble metals of group VIII of the periodic table.

15. The catalyst according to claim 14, further comprising one or more elements of groups IA, IIA, IIIA, IVA, VA of the periodic table or fluorine, chlorine, bromine or iodine.

16. A catalytic reforming reaction, comprising subjecting a hydrocarbon feed to reforming conditions, in the presence of a catalyst according to claim 14.

* * * * *